United States Patent [19]

Okano et al.

[11] Patent Number: 5,642,211
[45] Date of Patent: Jun. 24, 1997

[54] LIQUID CRYSTAL DISPLAY APPARATUS HAVING A NON-LINEAR RESISTOR CONNECTED TO THE PIXEL ELECTRODE AND USING A TWO-TERMINAL DEVICE AS A SWITCHING DEVICE

[75] Inventors: Kiyoshi Okano, Tenri; Masahiro Adachi, Nara, both of Japan

[73] Assignee: Sharp Kabushiki Kaisha, Osaka, Japan

[21] Appl. No.: 233,524

[22] Filed: Apr. 26, 1994

[30] Foreign Application Priority Data

Apr. 30, 1993 [JP] Japan .................................. 5-104843

[51] Int. Cl.⁶ ........................ H01L 29/04; G02F 1/1343
[52] U.S. Cl. .................... 349/41; 257/59; 349/49
[58] Field of Search ................. 359/57, 58; 257/58, 257/59

[56] References Cited

U.S. PATENT DOCUMENTS

| | | |
|---|---|---|
| 4,413,883 | 11/1983 | Baraff et al. . |
| 4,730,903 | 3/1988 | Yamazaki et al. . |
| 4,828,967 | 5/1989 | Mase et al. . |
| 4,953,155 | 8/1990 | Tangonan et al. ............ 359/117 |
| 4,980,307 | 12/1990 | Ito et al. ..................... 437/237 |
| 5,056,894 | 10/1991 | Kuijki . |
| 5,396,354 | 3/1995 | Shimada et al. . |

FOREIGN PATENT DOCUMENTS

| | | |
|---|---|---|
| 0377757 | 7/1990 | European Pat. Off. . |
| 0464810 A2 | 1/1992 | European Pat. Off. . |
| 49-75096 | 7/1974 | Japan . |
| 60-170888 | 9/1985 | Japan . |
| 61-32673 | 7/1986 | Japan . |
| 61-32674 | 7/1986 | Japan . |
| 1-270027 | 10/1989 | Japan . |
| 5-72570 | 3/1993 | Japan . |
| 6-313899 | 11/1994 | Japan . |

OTHER PUBLICATIONS

"Liquid Crystal Display", Liquid Crystal Display Division, p. 71, Sep. 1, 1991, with partial English translation.

Barov et al, Japanese Patent Publication No. 1-35352, published Jul. 25, 1989, with partial English translation.

Handa, Japanese Patent Publication 5-12588, published on Feb. 18, 1993 with partial English translation.

S. Mitsui et al, SID 92 Digest, pp. 437-4409, May, 1992, "Late–News Paper: Bright Reflective Multicolor LCDs Addressed by a–Si TFTs".

(List continued on next page.)

Primary Examiner—Sara W. Crane
Assistant Examiner—Fetsum Abraham
Attorney, Agent, or Firm—Nixon & Vanderhye, P.C.

[57] ABSTRACT

The display apparatus of this invention performs a display by modulating the optical characteristics of a display medium. The display apparatus includes: a first substrate; a second substrate facing the first substrate; a display medium interposed between the first and the second substrates; a plurality of bus lines disposed on the first substrate, the bus lines being arranged substantially in parallel to each other in a first direction; a plurality of counter electrodes disposed on the second substrate, the counter electrodes being arranged substantially in parallel to each other in a second direction which is perpendicular to the first direction; arrays of reflection electrodes disposed on the first substrate to substantially completely cover a respective one of the bus lines; and a nonlinear resistive layer mainly made of zinc sulfide and an insulating layer having a through hole which are disposed between each of the bus lines and a reflection electrode in a corresponding one of the reflection electrode arrays, wherein the nonlinear resistive layer is electrically connected to the bus line and the reflection electrode through the through hole, and the nonlinear resistive layer is in a non-conductive state when a voltage of a value smaller than a predetermined value is applied, and is in a conductive state when a voltage of a value equal to or larger than the predetermined value is applied.

30 Claims, 17 Drawing Sheets

OTHER PUBLICATIONS

Fukuzawa et al, "Mechanism of Memory Phenomena in Evaporated Amorphous ZnS Films", Applied Physics, vol. 46, No. 7, 1977 no month.

Sutherland, "A Theory For Negative Resistance and Memory Effects in Thin Insulating Films and its Application to Au–ZnS–Au Devices", J. Phys. D. Appl. Phys. 1971, vol. 4, pp. 468–479 no month.

Database WPI, Section Ch., Week 8124, Derwent Publications Ltd., London, GB; Class L03, AN 81-43253 & JP-A-56 046 584 no date.

Lechner et al, "Liquid Crystal Matrix Displays", Proceedings of the IEEE, vol. 59, No. 11, pp. 1566–1579, Nov. 1971.

Castleberry, "Varistor-Controlled Liquid-Crystal Displays", IEEE Transactions on Electron Devices, vol. ED-26, No. 8, pp. 1123–1128, Aug. 1979.

Baraff et al, "The Optimization of Metal–Insulator–Metal Nonlinear Devices for Use in Multiplexed Liquid Crystal Displays", IEEE Transactions on Electron Devices, vol. ED-28, No. 6, pp. 736–739, Jun. 1981.

Murray et al, "Conduction in Thin Films of R.F. Reactively Sputtered Zinc Sulphide", Thin Solid Films, 22, 1974, pp. 37–44 no month.

IBM Technical Disclosure Bulletin, vol. 28, No. 9, Feb. 1986, New York, US, pp. 4185–4186, "LCD Including a Non–Linear Characteristic Layer".

Patent Abstracts of Japan, vol. 017, No. 402 (P-1580), 27 Jul. 1993, & JP-A-05 072567 (Toppan Printing Co Ltd) 26 Mar. 1993.

Patent Abstracts of Japan, vol. 011, No. 181 (P-585), 11 Jun. 1987 & JP-A-62 011828 (Seiko Epson Corp) 20 Jan. 1987.

Bright reflective Multicolor LCD Addressed by Si —TFTs SID, vol. XXIII, May 17–22, 1992.

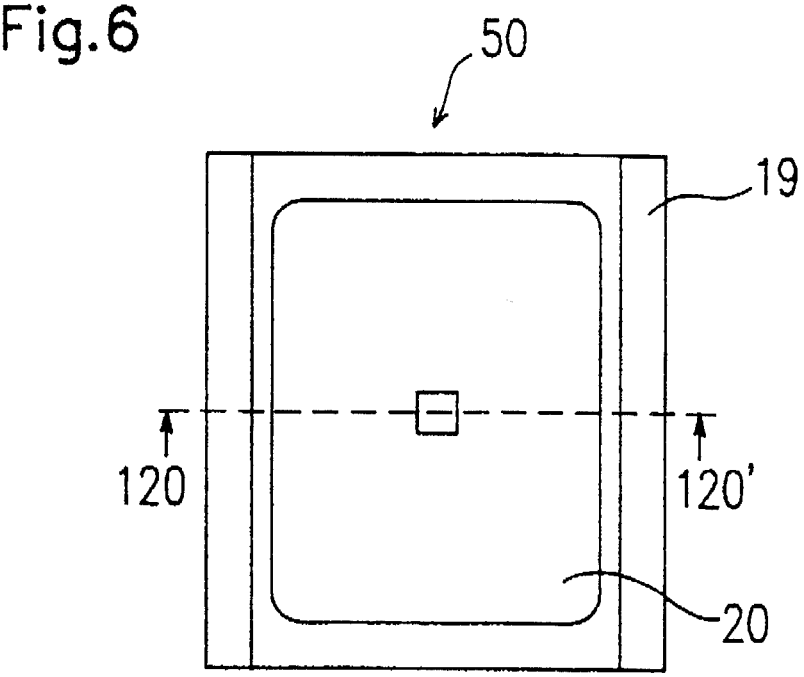

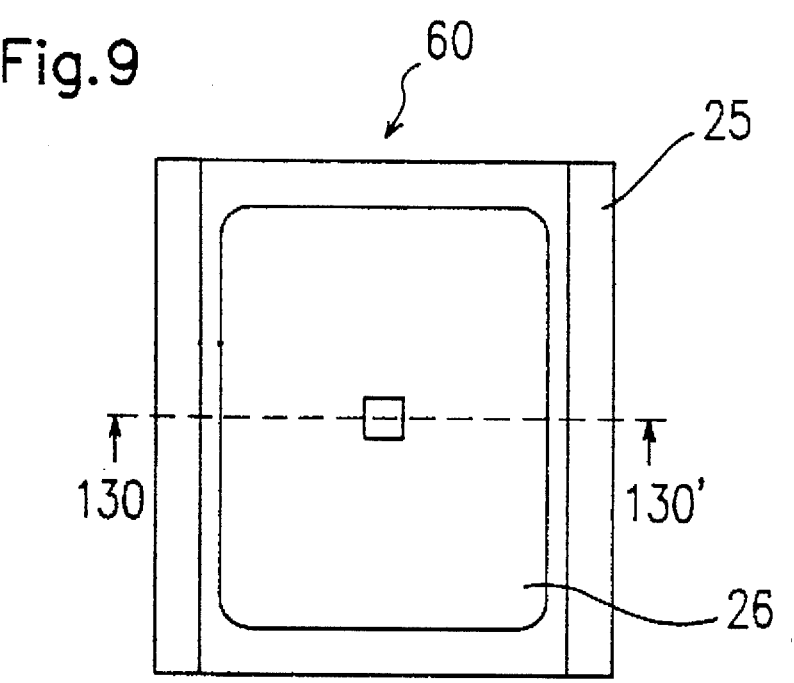

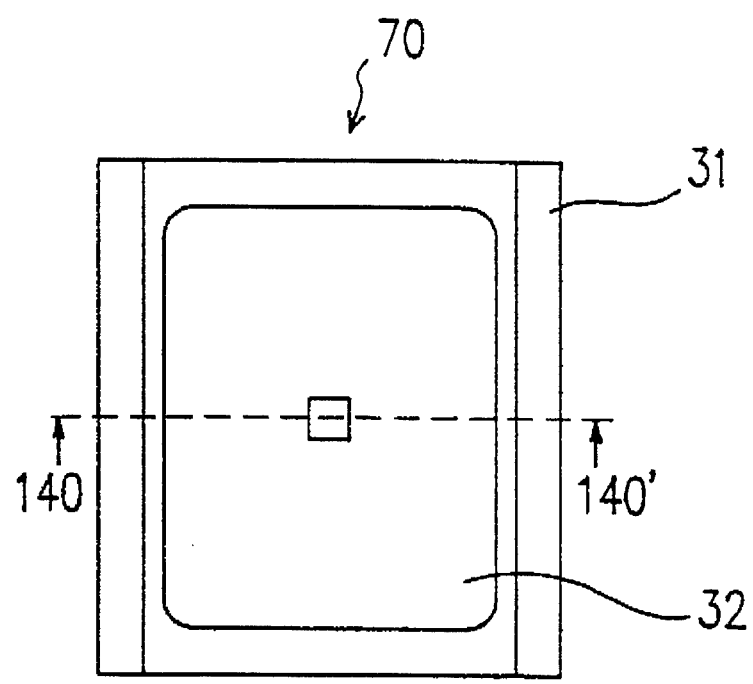

LIQUID CRYSTAL DISPLAY APPARATUS HAVING A NON-LINEAR RESISTOR CONNECTED TO THE PIXEL ELECTRODE AND USING A TWO-TERMINAL DEVICE AS A SWITCHING DEVICE

BACKGROUND OF THE INVENTION

1. Field of the Invention

The present invention relates to a liquid crystal display apparatus using a two-terminal device as a switching device, and particularly relates to a reflection type liquid crystal display apparatus using a two-terminal switching device.

2. Description of the Related Art

Portable OA equipment such as personal computers have been developed in recent years. Accordingly, reduction of production cost and the reduction of the power consumption of liquid crystal display (LCD) devices used for such OA equipment have become important challenges.

In order to display high quality images by providing pixels at a high density, each pixel is supplied with a nonlinear active element (switching device) for driving the LCD apparatus. This system of driving is referred to as the "active matrix driving system". The switching devices are mainly available in two types: two-terminal devices such as MIM (metal insulator metal) elements, diodes, and varistors; and three-terminal devices such as TFTs (thin film transistors) and MOS-FETs (metal oxide semiconductor field effect transistors).

The three-terminal devices have excellent functions as switching devices and are suitable for displaying an image having various tones, for which different pixels are used for different tones. However, the three-terminal devices have inconveniences in that the complicated production process including repetition of exposure to light can easily cause defects in the obtained devices, resulting in low production yields.

The two-terminal devices, which have a simpler structure than that of the three-terminal devices, are produced by a simpler method due to, for example, the fewer steps of masking required. Accordingly, the production yield of the two-terminal devices is higher than that of the three-terminal devices and the production cost is lower than that of the three-terminal devices. For these reasons, methods for driving pixels using the two-terminal devices, especially by utilizing a nonlinear part of the operating characteristics of the two-terminal devices, have been actively studied and developed.

Among such two-terminal switching devices at present, the MIM-TFD (thin film diode) element using $Ta_2O_5$ as the insulator layer is widely employed.

FIGS. 15 and 16A to 16C show an example of a conventional display apparatus 80 including a conventional MIM-TFD element. FIG. 15 is a plan view of a pixel and the vicinity thereof in the display apparatus 80. FIG. 16A to 16C are cross-sectional views of the display apparatus 80 shown in FIG. 15 looking along section lines 90–90', 91–91', and 92–92' in FIG. 15, respectively. Such a conventional structure of the MIM-TFD is described, for example, in "Liquid Crystal Display", Sharp Corp., Liquid Crystal Display Division, p. 71 and Japanese Patent Publication No. 1-35352.

The display apparatus 80 includes an insulating substrate 101 formed of glass or the like. A scanning line 102 formed of tantalum (Ta) is on a top surface of the substrate 101. A lower electrode 102' is branched from the scanning line 102 perpendicularly to the scanning line 102. A surface of the scanning line 102 and a surface of the electrode 102' are anodized to be an insulating layer 103. Specifically, the insulating layer 103 is formed of $Ta_2O_5$. A rectangular metal layer 104 formed of Ta, Cr, or the like is on the substrate 101, covering the insulating layer 103. The metal layer 104 is arranged in a direction so as to cross the electrode 102'. A generally rectangular pixel electrode 105 as is shown in FIG. 11A is on the substrate 101, covering two ends of the metal layer 104. The pixel electrode 105 is transparent and conductive and formed of ITO (indium tin oxide) or the like.

The MIM element 108 includes a three-layer structure including the lower electrode 102', the insulating layer 103, and the metal layer 104. The electrode 102' acts as a first metal layer, the insulating layer 103 acts as an active layer, and the metal layer 104 acts as a second metal layer.

FIG. 17 shows a schematic view of the current-voltage (I-V) characteristic of the MIM element. The I-V characteristic of the MIM element is expressed by Equations (1), (2) and (3) by Poole-Frenkel current.

$$I = \alpha \cdot V \cdot \exp(\beta \sqrt{V}) \tag{1}$$

$$\alpha = (n\mu q/d) \cdot \exp(-\phi/(kT)) \tag{2}$$

$$\beta = (1/(kT))\sqrt{(q^3/(\pi\ d))} \tag{3}$$

where q is the electric charge, n is the carrier density, μ is the mobility, φ is the depth of the trap, d is the thickness of the insulating layer, T is the temperature, K is the Boltzmann constant, and ∈ is the dielectric constant.

As is apparent from Equation (1), β, which is expressed by Equation (3) indicates the steepness of the I-V characteristic. It is preferable to obtain the highest possible value for β. For example, the value of β is approximately 3 to 4 inclusive in the MIM element including the insulating layer formed of $Ta_2O_5$.

With regards to the reduction of power consumption, because a transmission type LCD which requires a back light does not take much advantage of the liquid crystal not emitting light by itself, a reflection type LCD which can display images without a back light has been proposed.

An LCD which utilizes a TN (Twisted Nematic) operation mode requires polarizers. When polarizers are used in the reflection type LCD, the efficiency of light utilization decreases due to the polarizer, resulting in a dark and indistinct display. Thus it is desired to use an LCD operation mode which does not use polarizers.

A typical LCD operation mode which requires no polarizer is the guest-host operation mode. The guest-host type LCD employs a liquid crystal material in which a dual-color dye which is anisotropic in absorbing visible light between the major axis and minor axis of the dye molecule is dissolved. An exemplary one of the guest-host modes is a cholesteric-nematic phase change guest-host (PCGH) mode, in which a p-type dye having a positive anisotropic dielectric constant ($\Delta\epsilon = \epsilon_\parallel - \epsilon_\perp$) is used as the dual-color dye. The PCGH mode, also called the White-Taylor mode after the names of the inventors, is capable of displaying white color nearly equal to paper white and has a feature capable of providing a high contrast.

An example of applying the PCGH mode to the LCD using a TFT element is described in SID 92 DIGEST p. 437, and an example of applying the PCGH mode to the LCD using an MIM element having the nonlinear resistive layer of $Ta_2O_5$ is described in the Japanese Laid-open Patent Publication No. 5-12688.

A conventional reflection type LCD has several problems. The most serious problem among these is its low efficiency in utilizing light. This problem is caused by such factors as the requirement of the polarizers (which are indispensable when the TN mode is employed), a decrease in the aperture ratio due to the requirement of an area for bus lines, etc.

When the PCGH mode (described above) using no polarizer is employed to improve the light utilization efficiency, a bright reflection type LCD may be obtained. However, an experimental result has shown that there are some difficulties in driving an LCD in the PCGH mode by using an MIM element having a nonlinear resistive layer of $Ta_2O_5$ as described in the Japanese Laid-open Patent Publication No. 5-12688. This is because the VAT (applied voltage-transmittance) characteristic of the liquid crystal used in the PCGH mode (called PCGH liquid crystal hereafter) is not very sharp.

In the PCGH mode, a focal conic state which is a transition state from a cholesteric state to a nematic state cannot be used for displaying, and the nonlinear characteristic of the MIM element having a $Ta_2O_5$ layer is not so much sharp in the high electric field region, the ratio $I_{20\nu}/I_{5\nu}$, which is an index of sharpness remains around $10^3$. The value of the ratio does not sufficiently satisfy the requirement of a very sharp I-V characteristic for the active element (the switching element such as MIM or TFT) in the PCGH mode described above.

The PCGH type LCD requires a switching element having a sufficiently sharper I-V characteristic. It is known that a very sharp I-V characteristic is an important desirable factor for preventing cross talk when driving a TN liquid crystal display apparatus.

On the other hand, with regards to the light utilization efficiency, the only way to increase the aperture ratio seems to be to use thinner bus lines as far as such a configuration of the pixel electrode and the switching element as adopted in the conventional LCD apparatus.

However, the thinner a bus line is, the higher the resistance of the bus line becomes. Thus improvement in the aperture ratio and the decrease in the resistance of bus line conflict with each other in the conventional LCD apparatus, and it has been impossible to achieve an increased aperture ratio and decreased resistance of the bus line at the same time. It has also been difficult to obtain a LCD having a large area.

SUMMARY OF THE INVENTION

The display apparatus of this invention performs a display by modulating the optical characteristics of a display medium. The display apparatus includes: a first substrate; a second substrate facing the first substrate; a display medium interposed between the first and the second substrates; a plurality of bus lines disposed on the first substrate, the bus lines being arranged substantially in parallel to each other in a first direction; a plurality of counter electrodes disposed on the second substrate, the counter electrodes being arranged substantially in parallel to each other in a second direction which is perpendicular to the first direction; arrays of a plurality of reflection electrodes disposed on the first substrate to substantially completely cover a respective one of the bus lines; and a nonlinear resistive layer mainly made of zinc sulfide and an insulating layer having through holes which are disposed between each of the bus lines and a reflection electrode in a corresponding one of the reflection electrode arrays, wherein the nonlinear resistive layer is electrically connected to the bus line and the reflection electrode through the through hole, and the nonlinear resistive layer is in a non-conductive state when a voltage of a value smaller than a predetermined value is applied, and is in a conductive state when a voltage of a value equal to or larger than the predetermined value is applied.

In one embodiment of the invention, the insulating layer is formed on the nonlinear resistive layer to cover the nonlinear resistive layer. A second insulating layer may be formed between the bus line and the nonlinear resistive layer. The insulating layer can be formed of a substance selected from the group consisting of a polymer compound and a photo-sensitive resin. The polymer compound may be selected from the group consisting of silicon nitride, silicon oxide, polyimide, and acrylic. The second insulating layer may be obtained by anodizing the bus line. Alternatively, the second insulating layer may be formed of a substance selected from the group consisting of a nitrogen compound and silicon oxide.

In another embodiment of the invention, the insulating layer is formed on the first substrate to cover the bus line. A second insulating layer may be formed between the nonlinear resistive layer and the reflection electrode. The insulating layer can be formed of a substance selected from the group consisting of a polymer compound and a photo-sensitive resin. The polymer compound may be selected from the group consisting of silicon nitride, silicon oxide, polyimide, and acrylic. The second insulating layer may be formed of a substance selected from the group consisting of a nitrogen compound and silicon oxide.

In another embodiment of the invention, a surface of the insulating layer is made uneven which causes the surface of the reflection electrode to be uneven.

In another embodiment of the invention, the reflection electrode is formed of a material selected from the group consisting of Al, Ag, Cr, Ni, Cu, Ti, and alloys thereof.

In another embodiment of the invention, the counter electrodes are substantially transparent.

In another embodiment of the invention, the through hole has an opening having an area of 10 $\mu m^2$ to 100 $\mu m^2$ inclusive.

In another embodiment of the invention, the through hole is located substantially under the center of the reflection electrode.

In another embodiment of the invention, the nonlinear resistive layer has a thickness in the range of 50 nm to 500 nm.

In another embodiment of the invention, the nonlinear resistive layer includes an impurity. The impurity may be selected from the group consisting of manganese, copper, rare earth elements, compounds including a rare earth element, the III-group elements, and compounds thereof.

In another embodiment of the invention, the nonlinear resistive layer is made of zinc sulfide having a composition expressed by $Zn_xS_{(1-x)}$, where x satisfies the condition of x ≠0.5.

In another embodiment of the invention, the width of the bus line in the second direction is smaller than the width of the reflection electrode in the second direction.

In another embodiment of the invention, the width of the bus line in the second direction is larger than the width of the reflection electrode in the second direction.

In another embodiment of the invention, the width of the bus line in the second direction is substantially equal to a width of the reflection electrode in the second direction.

In another embodiment of the invention, the display medium is a liquid crystal. The display medium may be a cholesteric-nematic phase change guest-host mode liquid crystal.

Thus, the invention described herein makes possible the advantages of (1) providing a liquid crystal display apparatus using a switching element with a very sharp I-V characteristic and (2) providing a liquid crystal display having an improved efficiency of light utilization with the low resistance of a bus line.

These and other advantages of the present invention will become apparent to those skilled in the art upon reading and understanding the following detailed description with reference to the accompanying figures.

BRIEF DESCRIPTION OF THE DRAWINGS

FIG. 6 is a top view of a part of a liquid crystal display apparatus in a second example according to the invention.

FIG. 9 is a top view showing a part of a liquid crystal display apparatus of a third example according to the invention.

FIG. 12 is a top view showing a part of a liquid crystal display apparatus in a fourth example according to the invention.

DESCRIPTION OF THE PREFERRED EMBODIMENTS

A display apparatus according to the present invention includes a two-terminal device having an active layer (nonlinear resistive layer) formed of a thin zinc sulfide (ZnS) film. The two-terminal device has a metal-semiconductor-metal (MSM) structure where ZnS is a compound semiconductor. The nonlinearity in the electric resistance of the active layer is utilized for display. It is known that there are mainly two types of I-V characteristics: the Poole-Frenkel characteristic and the switching characteristic. The switching characteristic indicates a high resistance state and a low resistance state.

By controlling the condition of the ZnS film, an I-V characteristic showing a sharp and continuous curve can be obtained. In this specification, continuous means that the curve has a continuous slope in which the inclination increases or decreases but does not change to the opposite direction.

Figure 5A:
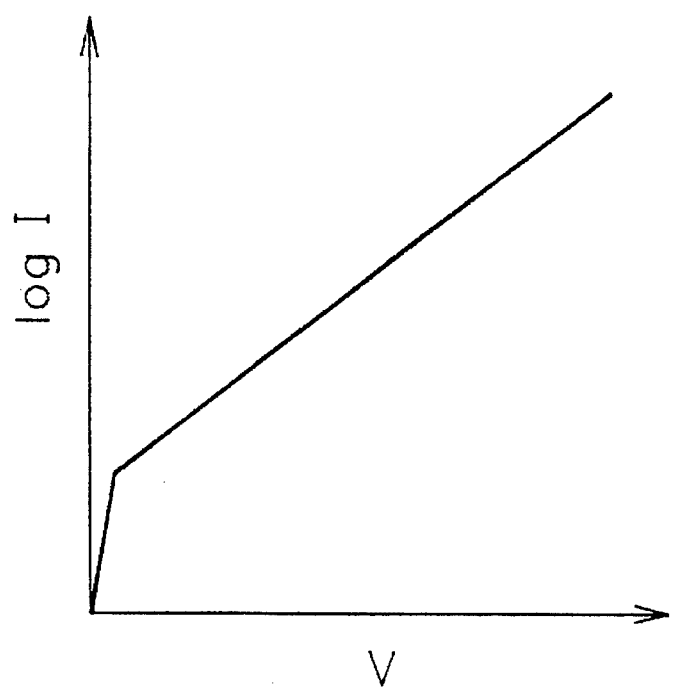
FIG. 5A shows a curve representing the I-V characteristic of a ZnS film used in the display apparatus of the first example.

FIG. 5A shows a curve representing the I-V characteristic of a ZnS film used in a display apparatus according to the present invention. In the present invention, a ZnS thin film which realizes an I-V characteristic showing a continuous curve and having a better steepness than that of an insulating layer (active layer) formed of $Ta_2O_5$ or $SiN_x$ is used. This means the ZnS film used in the present invention is suitable for the switching device for a PCGH type LCD.

The I-V characteristic of the MSM element using ZnS film is substantially expressed by the following Equation (4).

$$I = \alpha \cdot \exp(\beta \cdot V) \quad (4)$$

It has been found that the ratio Ion/Ioff, which represents the current ON/OFF ratio (measured in terms of $I_{20v}/I_{5v}$, the index described previously), has a value of the order of $10^5$, showing a very sharp characteristic compared to $Ta_2O_5$-MIM. Thus using this MSM element makes it possible to drive an LCD in a PCGH operation mode under sufficiently good conditions.

The characteristics of the MSM element can also be finely controlled to fit the characteristics of the liquid crystal to be used, in such a manner as changing the values of the coefficients $\alpha$ and $\beta$ of Equation (4) and increasing the dielectric breakdown voltage. For example, the characteristics of the MSM element are controlled by (i) changing the composition ratio of zinc (Zn) and sulfur (S) of the nonlinear resistive layer of ZnS, or (ii) adding an impurity selected from rare earth elements such as terbium (Tb), samarium (Sm) and europium (Eu), group III elements such as aluminum (Al) and gallium (Ga) on other elements such as manganese (Mn) and copper (Cu), or compounds of these elements to the layer of ZnS. The characteristics of the active element can also be changed by interposing a relatively thin insulating layer on the upper face and/or lower face of the nonlinear resistive layer.

Decrease in the aperture ratio due to the bus line can also be prevented by disposing the bus line under the pixel element instead of disposing the bus line beside the pixel electrode. Aperture ratio can be increased because the bus line does not occupy the pixel electrode area. Further, resistance of the bus line can be decreased by increasing the width of the bus line to an extent that matches the width of the pixel electrode.

Hereinafter, the present invention will be described by way of illustrative examples with reference to the accompanying drawings.

EXAMPLE 1

A first example of a display apparatus according to the present invention will be described with reference to FIGS. 1 through 5.

Figure 1:
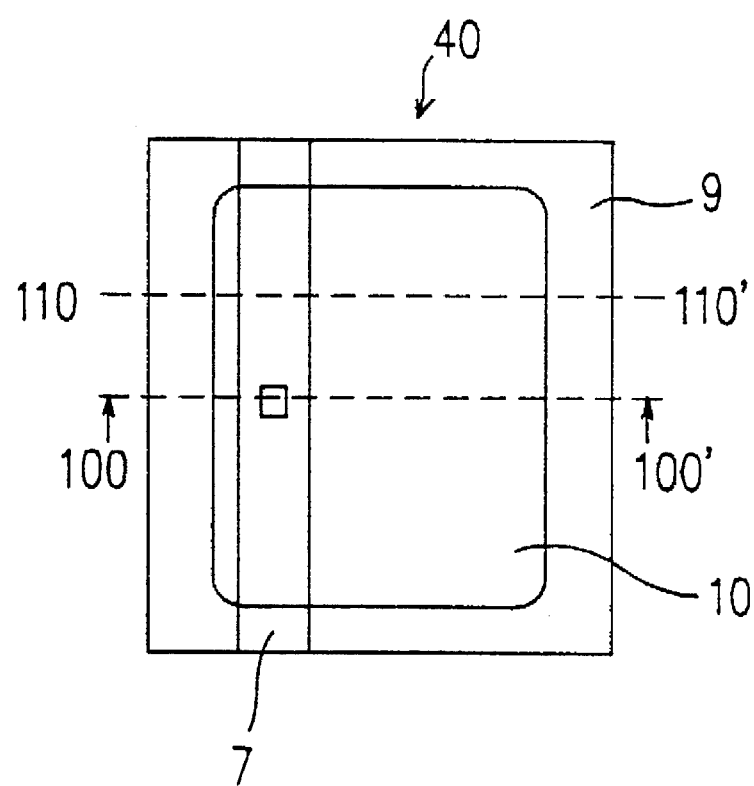
FIG. 1 is a top view showing a part of a liquid crystal display apparatus of a first example according to the invention.
Figure 2A:
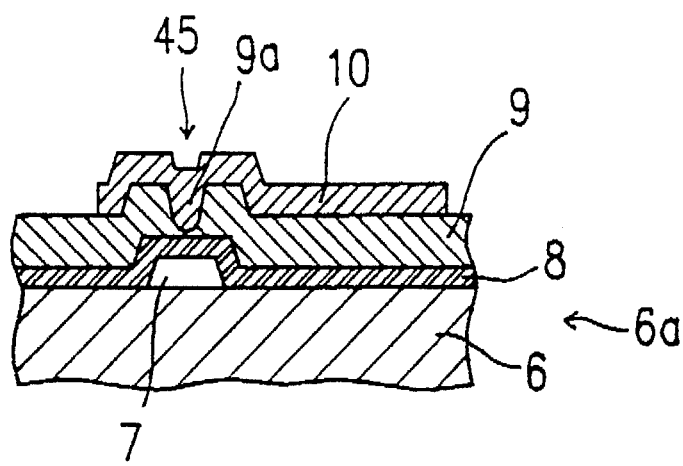
FIG. 2A is a cross-sectional view of the liquid crystal display apparatus shown in FIG. 1 looking along section line 100–100' in FIG. 1.
Figure 2B:
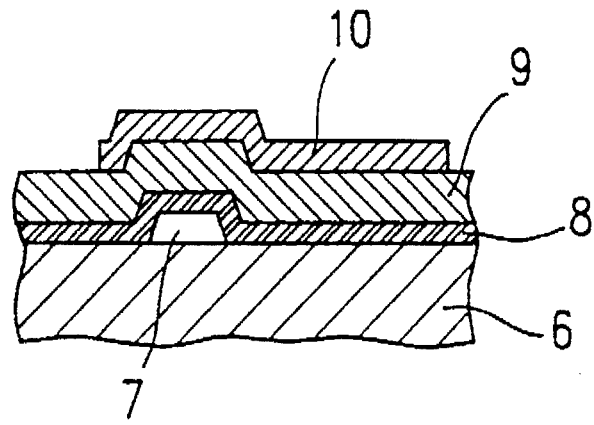
FIG. 2B is a cross-sectional view of the liquid crystal display apparatus shown in FIG. 1 looking along section line 110–110' in FIG. 1.

FIGS. 1, 2A and 2B show a part of an LCD apparatus 40 in the first example according to the present invention. The LCD apparatus 40 is a reflection type LCD. FIG. 1 is a top view of a rectangular pixel electrode 10 and the vicinity thereof in LCD apparatus 40; FIG. 2A is a cross-sectional view of the LCD apparatus 40 shown in FIG. 1 looking along section line 100–100' in FIG. 1; and FIG. 2B is a cross-sectional view of the LCD apparatus 40 shown in FIG. 1 looking along section line 110–110' in FIG. 1.

As is shown in FIGSS. 2A and 2B, the LCD apparatus 40 includes an insulating base substrate 6 formed of glass or the like. A plurality of pixel electrodes 10 (only one is shown in FIG. 1 ) are arranged in a matrix on a top surface of the base substrate 6. A plurality of bus lines 7 (only one is shown in FIG. 1) respectively corresponding to the pixel electrode 10 are also on the top surface of the base substrate 6, each for sending a timing signal to the corresponding pixel electrode 10 to drive the pixel electrode 10. The bus line 7 is disposed under the pixel electrode 10 and passes under each pixel electrode 10 as is shown in FIGS. 2A and 2B.

The bus line 7 and the pixel electrode 10 are connected to each other by a switching element 45 as is shown in FIG. 2A.

The element side substrate 6a is shown in FIG. 2A. A bus line 7 made of Ta is formed on a base substrate 6. A ZnS layer (nonlinear resistive layer) 8 formed of a thin ZnS film covers the entire top surface of the base substrate 6, covering the bus line 7. An insulating layer 9 made of an organic photo-sensitive resin is formed on the nonlinear resistive layer 8. The insulator layer 9 has a through hole 9a being formed above the bus line 7. A pixel electrode 10 made of Al is formed on layer 9, covering and filling the through hole 9a.

The two-terminal device (MSM switching element) is formed in the portion where the through hole 9a is formed and the three-layered structure of the bus line 7, the ZnS layer 8, and the pixel electrode 10 is formed. That is, the specified section of the bus line 7 serves as the lower electrode of the switching element and the pixel electrode 10 serves as both the upper electrode of the switching element and a reflector. According to the present invention, the continuous and steep I-V characteristic of the ZnS layer (active layer of the switching element) is used in the two-terminal device.

Figure 3:
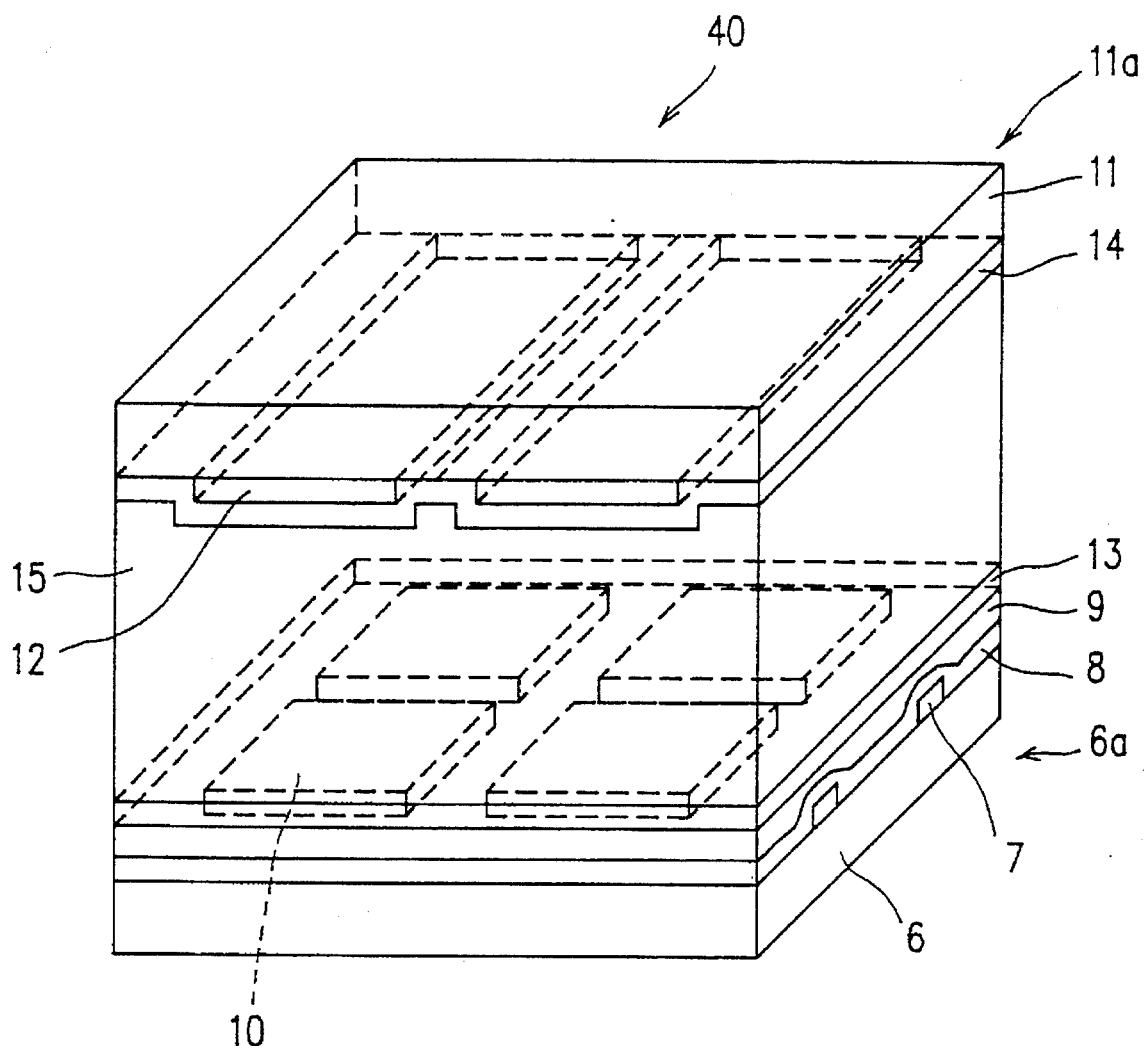
FIG. 3 is a partial isometric view of the liquid crystal display apparatus of the first example.

FIG. 3 is a partial isometric view of the display apparatus 40 shown in FIGS. 1, 2A and 2B. As is shown in FIG. 3, an insulating counter substrate 11 formed of glass or the like is opposed to the base substrate 6 with a liquid crystal layer 15 as a display medium sandwiched therebetween. A plurality of counter electrodes 12 are on the bottom surface of the counter substrate 11 facing the base substrate 6, the counter electrodes 12 being arranged in such a direction as to cross the bus line 7. An alignment film 14 covers the entire bottom surface of the counter substrate 11, covering the counter electrodes 12.

The LCD apparatus 40 having the above-described structure is produced in the following manner.

First, the element side substrate 6a is manufactured as follows.

On the insulating base substrate 6 formed of glass or the like (for example, borosilicate glass #7059 made by Corning Glass Inc.), a conductive thin film formed of Ta is formed in a specified thickness (300 nm in this first example) by sputtering. The conductive thin film may be formed by CVD, evaporation or the like instead of sputtering.

Figure 4A:
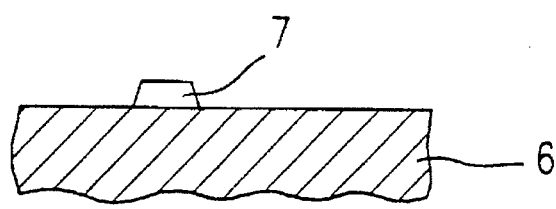
FIGS. 4A to 4D are cross-sectional views illustrating the process of forming an element side substrate provided in the liquid crystal display apparatus of the first example.

The conductive thin film formed of Ta is patterned into a specified pattern to form the bus line 7 including the lower electrode of the switching element 45 (FIG. 4A). The material of the bus line 7 is not limited to Ta and may be formed of Nb or the like.

The patterning of the bus line 7 is performed by using the photo-lithography process (application of a photo-resist, exposure and development), and reactive ion etching (RIE) process which is one of the dry etching processes using mixed gas plasma of $CF_4$ and $O_2$.

Figure 4B:
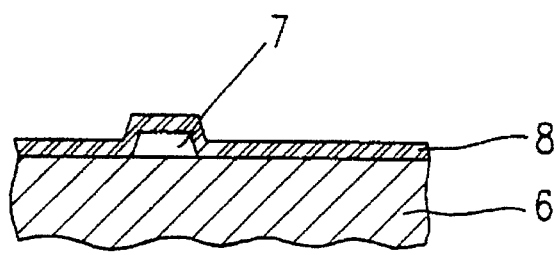

The ZnS layer 8 is formed over the entire top surface of the base substrate 6 in a specified thickness by a sputtering method so as to cover the bus line 8 (FIG. 4B). The thickness of the ZnS layer 8 is determined as follows based on the driving voltage for the LCD apparatus 40, namely, a voltage which is necessary to cause liquid crystal molecules in the liquid crystal layer 15 as the display medium to display an image.

When an electric field applied to the ZnS layer 8 reaches a certain level, a current suddenly flows in the ZnS layer 8. Such a certain level is referred to as the threshold level of the electric field (or withstand voltage). The threshold voltage depends on the thickness of the ZnS layer 8. Accordingly, the thickness of the ZnS layer 8 is determined so that the voltage applied to the liquid crystal layer 15 should reach the driving voltage for display when the voltage applied to the ZnS layer 8 exceeds the threshold level, namely, the ZnS layer 8 as the switching device is turned "ON".

The threshold level of the electric field is in proportion to the thickness of the ZnS layer 8. Where the thickness is less than 10 nm, the I-V characteristic is unstable; and where the thickness is more than 1 μm, the steepness of the I-V characteristic declines. Accordingly, in order to obtain a stable and steep I-V characteristic, the thickness of the ZnS layer 8 should be between 10 nm and 1 μm, preferably 30 nm to 200 nm inclusive. In the first example, the thickness of the ZnS layer 8 is about 150 nm.

As the sputtering target, a highly pure, sintered ZnS target is used. Or, highly pure ZnS powders which are densely spread all over a quartz glass plate may be used. The sputtering is performed using argon (At) as the sputtering gas, at a substrate temperature of 250° C., a gas pressure of 10 Pa and an input power of 750 W.

The ZnS layer 8 may be formed by CVD, evaporation or other thin film formation methods instead of sputtering.

In order to reduce the number of the process steps, the ZnS layer 8 is not patterned and is only processed for taking out a terminal to connect to the liquid crystal driver. However, areas of the ZnS layer 8 other than the specified portion included in the switching element 45 may be removed.

After the formation of the ZnS layer 8, the entire surface of the glass substrate 6 is coated with an insulation organic photo-sensitive resin using a spinner, a roller coater or the like to form the insulating layer 9. The insulating layer 9 has a thickness of 500 nm, in this first example. The insulating layer 9 formed of a photo-sensitive resin protects the ZnS layer 8 without influencing electric characteristics of the two-terminal device 45 of the LCD apparatus 40.

Organic substances such as acrylic resins, polyimide, polyamide, or polymethyl methacrylate, etc., may be used as a photo-sensitive resin for the insulating layer 9.

Figure 4C:
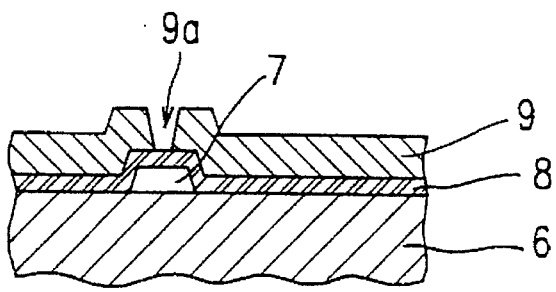
Figure 4D:
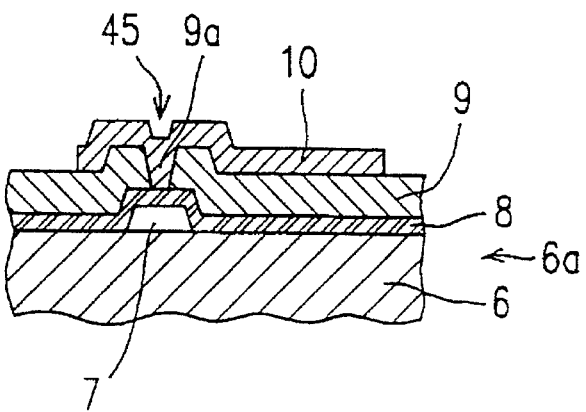

After the formation of the insulating layer 9, the through hole 9a is formed in the insulating layer 9 as shown in FIG. 4C. The through hole 9a is formed by using a photographic method including exposure with a photo-mask and development. The opening area of the through hole is preferably in a range 10 µm² to 1,000 µm².

As described above, by using the photosensitive resin for the insulating layer 9, the step of applying photo-resist can be eliminated to simplify the producing process.

Then, the pixel electrode 10 is formed in such a pattern that the pixel electrode 10 fills the through hole 9a. The ZnS layer 8 and the pixel electrode 10 are electrically connected with each other through the through hole 9a.

First, a conductive film for forming the pixel electrode 10 is formed on the ZnS layer 8. In the first example, an Al film is formed by sputtering. The thickness of the Al film is about 200 nm. For a reflection type LCD apparatus, the conductive film may be formed of a metal such as Ni, Ti, Ag, Cr, Cu and alloys thereof as well as Al.

Then, the Al film is patterned into a specified pattern to form the pixel electrode 10 as shown in FIGS. 1, 2A and 2B so that the pixel electrode 10 covers the bus line 7 with its entire width along the direction of the bus line 7.

The pixel electrode 10 is patterned by using a photo-process, and wet etching process with phosphoric acid or the like. The pixel electrode 10 serves as both the upper electrode of the switching element 45 and the reflector.

Then, the alignment film 13 is formed on the entire surface of the element side substrate 6a. In detail, a material for the alignment film 13 containing, for example, polyimide is formed on the entire surface of the element side substrate 6a, and then the material is cured and aligned.

Next, the counter substrate 11a is produced as follows. As shown in FIG. 3, on the bottom surface of a second base substrate 11 to face the base substrate 6, a transparent electrically conductive film is formed and patterned to form a plurality of counter electrodes 12 corresponding to the plurality of pixel electrodes 10, respectively. The second base substrate 11 is made of glass or the like, and the transparent electrically conductive film is an ITO film in this example.

The counter electrodes 12 are arranged substantially in parallel to one another, forming a pattern of stripes. Each counter electrode 12 has a width sufficient to cover the corresponding pixel electrode 10.

The element side substrate 6a may be produced after the counter substrate 11a or simultaneously.

The alignment film 14 is formed on the entire bottom surface of the counter substrate 11a. In detail, a material for the alignment film 14 is formed on the entire bottom surface of the counter substrate 11a so as to cover the counter electrodes 12. The material is cured and then aligned.

The element side substrate 6a and the counter substrate 11a are assembled with spacers (not shown) sandwiched therebetween so that the top surface of the base substrate 6a and the bottom surface of the counter substrate 11a face each other and so that the bus lines 7 and the counter electrodes 12 are arranged in such directions as to cross each other.

The p type PCGH liquid crystal is injected between the element side substrate 6a and the counter substrate 11a to form the liquid crystal layer 15, and then the liquid crystal layer 15 is sealed. FIG. 3 shows a part thereof corresponding to several pixels.

The LCD apparatus 40 produced in the abovedescribed manner operates in the following way.

Figure 5B:
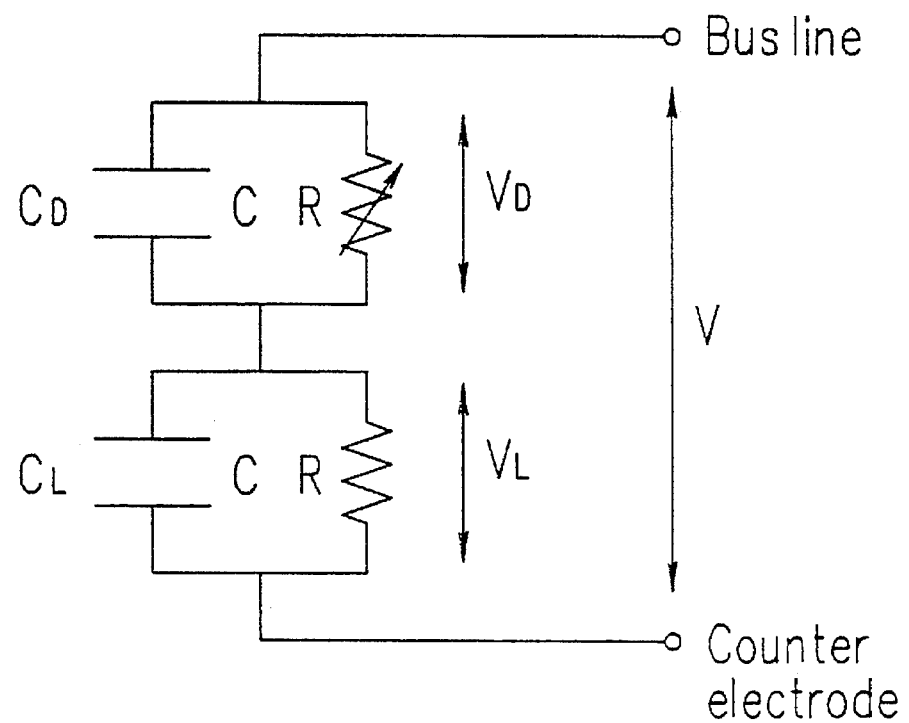
FIG. 5B is an equivalent circuit diagram corresponding to one pixel of a liquid crystal display apparatus including a two-terminal device.

As is mentioned above, FIG. 5A is a graph illustrating a curve representing the I-V characteristic of a two-terminal device used in the present invention, for example, the two-terminal device 45. The current I is represented in logarithmic scale in FIG. 5A. FIG. 5B is an equivalent circuit diagram corresponding to one pixel of an LCD apparatus including the two-terminal device, for example, the LCD apparatus 45.

As is shown in FIG. 5B, the LCD apparatus has a capacitance $C_D$, and the liquid crystal layer has a capacitance $C_L$. The pixel is equivalent to a circuit including the capacitances $C_D$ and $C_L$ connected with each other in series between the lower electrode (the bus line) 7 and the counter electrode 12.

When a voltage is applied to two ends of the LCD apparatus 40, namely, to the bus line 7 and to the counter electrode 12, a voltage $V_D$ applied to the two-terminal device 45 is expressed by Equation (5). In other words, the voltage $V_D$ is obtained by capacitance-division of the voltage V.

$$V_D = V \cdot C_L / (C_L + C_D) \quad (5)$$

A voltage $V_L$ applied to the capacitance of the liquid crystal layer 15 is expressed by Equation (6).

$$V_L = V \cdot C_D / (C_L + C_D) \quad (6)$$

It is apparent from Equation (5) that, when $C_L >> C_D$, $V_D$ is approximately equal to V. Accordingly, the voltage $V_D$ at a sufficient level is applied to the two-terminal device 45. When the voltage $V_D$ applied to the two-terminal device 45 exceeds a threshold voltage $V_{TH}$ of the two-terminal device 45, the two-terminal device 45 is turned ON.

When the two-terminal device 45 is ON, the voltage $V_L$ expressed by Equation (6) is applied to the liquid crystal layer 15, and thus an electric charge is stored in the capacitance $C_L$ of the liquid crystal layer 15.

When the voltage $V_D$ applied to the two-terminal device 45 is decreased to below the threshold voltage $V_{TH}$ of the two-terminal device 45, the two-terminal device 45 is turned OFF. Even when the two-terminal device 45 is OFF, the liquid crystal molecules are driven by the electric charge stored in the capacitance $C_L$ of the liquid crystal layer 15 when the two-terminal device 45 is ON.

The I-V characteristic of the MIM switching element employing zinc sulfide (ZnS) as a non-linear resistive layer (ZnS-MSM element) has been experimentally ensured to be expressed by the Equation (4).

Figure 17:
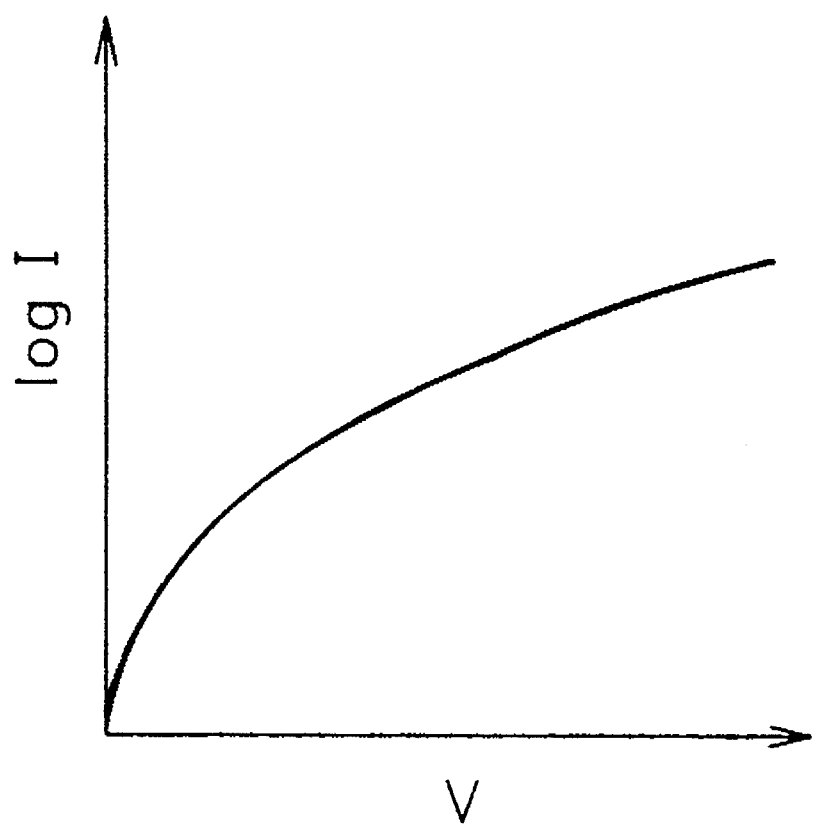
FIG. 17 shows a curve illustrating the I-V characteristic of the active element of the conventional liquid crystal display apparatus.

It has been found that the current ON/OFF ratio $I_{20v}/I_{5v}$ has a value in the order of $10^5$, showing a very sharp characteristic as is shown in FIG. 5A, compared to that of $Ta_2O_5$–MIM element as is shown in FIG. 17. Thus, according the first example, using this MSM element 45 makes it possible to drive an LCD in a PCGH operation mode under sufficiently good conditions.

Because the bus line 7 passes below the pixel electrode 10, decrease in the aperture ratio due to the bus line 7 can also be prevented by disposing the bus line under the pixel element instead of disposing the bus line beside the pixel electrode. The aperture ratio can be increased because the bus line does not occupy the pixel electrode area. Further, the resistance of the bus line can be decreased by increasing the width of the bus line to an extent that matches the width of the pixel electrode.

The characteristics of the MSM element can also be finely controlled to fit the characteristics of the liquid crystal to be used, in such a manner as changing the values of the coefficients α and β of Equation (4) and increasing the dielectric breakdown voltage. For example, the characteristics of the MSM element is controlled by (i) changing the composition ratio of zinc (Zn) and sulfur (S) of the nonlinear resistive layer of ZnS, or (ii) adding an impurity selected from rare earth elements such as terbium (Tb), samarium (Sm) and europium (Eu), group III elements such as aluminum (Al) and gallium (Ga) and other elements such as manganese (Mn) and copper (Cu), or compounds of these elements to the layer of ZnS. The characteristics of the active element can also be changed by interposing a relatively thin insulating layer on upper face and/or under face of the nonlinear resistive layer.

Further, the insulator layer 9 is not limited to the organic photo-sensitive resin and another material may be used.

The surface of the insulating layer 9 may be corrugated so as to make the surface of the pixel electrode 10 formed on the insulating layer 9 to also be corrugated. By such corrugation, the light incident on the LCD apparatus 40 is not reflected in such a manner as is reflected on a mirror surface, and thus the display quality is enhanced.

The nonlinear resistive layer 8 may be formed by using a film forming process other than the sputtering, such as an electron beam (EB) deposition process, a chemical vaper deposition (CVD) process or an atomic layer epitaxy (ALE) process.

EXAMPLE 2

Referring to FIGS. 6 to 8D, a second example of a display apparatus according to the present invention will be described.

Figure 7:
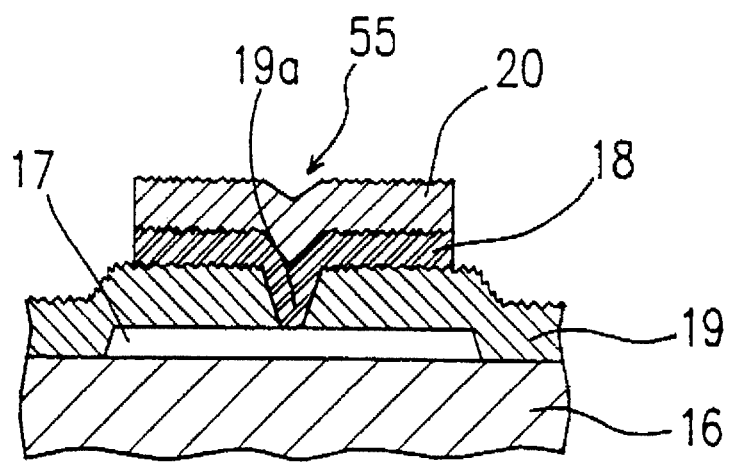
FIG. 7 is a cross-sectional view of the liquid crystal display apparatus shown in FIG. 6 looking along section line 120–120' in FIG. 6.

FIGS. 6 and 7 show a part of an LCD apparatus 50 in the second example according to the present invention. FIG. 6 is a top view of a rectangular pixel electrode 20 and the vicinity thereof in the LCD apparatus 50; and FIG. 7 is a cross-sectional view of the LCD apparatus 50 shown in FIG. 6 looking along the section line 120–120' in FIG. 6.

As is shown in FIG. 6, the LCD apparatus 50 includes the base substrate 16. The bus line 17 is on the top surface of the base substrate 16. The bus line 17 has a width nearly equal to or wider than that of the pixel electrode 20. In the second example, an insulating layer 19 having a through hole 19a therein is interposed on the base substrate 16, covering the bus line 17. The ZnS layer 18 is formed on the insulating layer 19. It should be noted that the ZnS layer 18 does not cover the entire base substrate 16.

The pixel electrode 20 is on the ZnS layer 18 covering the ZnS layer 18. The two-terminal device 55 is formed in the area in which the through hole 19a is formed. The two-terminal device 55 includes the three-layer structure including the lower electrode (a corresponding portion of the bus line) 17, the ZnS layer 18, and the upper electrode (a corresponding portion of the pixel electrode) 20.

The LCD apparatus 50 having the above-described structure is produced in the following manner.

Figure 8A:
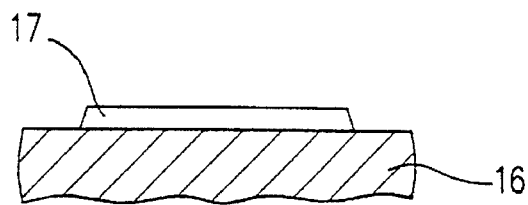
FIGS. 8A to 8D are diagrams illustrating the process of forming an element side substrate provided in the liquid crystal display apparatus of the second example.

First, a film of Al is formed on the base substrate 16 in a specified thickness by sputtering and patterned into a specified pattern to form the bus line 17 (FIG. 8A). The base substrate 16 is formed of a glass (for example, borosilicate glass #7059 made by Corning Glass Inc.). The bus line 17 is formed by using a photo-lithography process and etching with phosphoric acid or the like.

The reason for using Al as the bus line 17 is to improve a symmetry of I-V characteristic of the two-terminal element 55 by using the same metal for the lower electrode as the pixel electrode (upper electrode) 20. The thickness of the bus line 17 is about 300 nm in this second example.

Figure 8B:
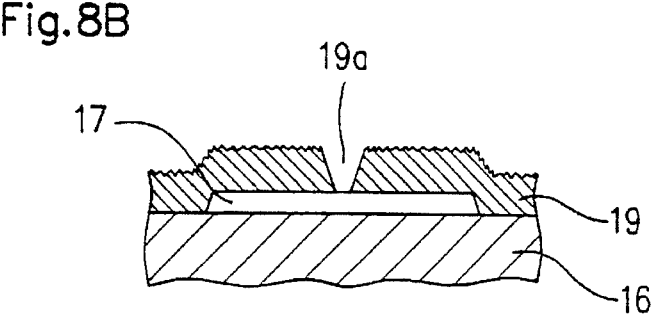

Then, the insulating layer 19 made of silicon nitride (SiNx) is formed by sputtering as is illustrated in FIG. 8B.

The insulating layer 19 may be lightly hit by $CF_4+O_2$ gas plasma on the top face thereof, using a similar process as the RIE, so as to form a corrugated surface on the insulating layer 19. A surface of the pixel electrode 20 formed on the insulating layer 19 is also corrugated. By such a corrugation, the pixel electrode 20 has a good function as a reflector.

Then through photo-lithography and RIE processes, a through hole 19a is formed as shown in FIG. 8B in the insulating layer 19 for connecting the bus line 17 and the nonlinear resistive layer 18. The opening area of the through hole is preferably in a range 10 μm² to 1,000 μm².

Figure 8C:
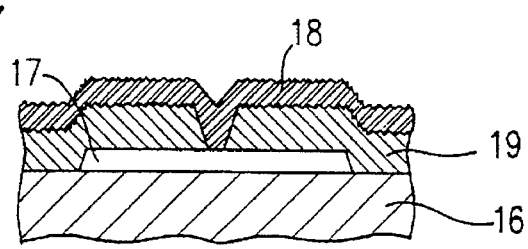

Then, the ZnS layer 18 is formed on the insulating layer 19 by sputtering of the target made of Zn in an atmosphere of hydrogen sulfide ($H_2S$) gas. The nonlinear resistive layer 18 has a thickness about 150 nm and covers the entire surface of the base substrate 16 as shown in FIG. 8C.

In the sputtering process, it is possible to control the component ratio of Zn and S by means of controlling the gas pressure of the sputtering gas $H_2S$, thereby making it possible to control the characteristics of the active element 55.

A film of Al is formed on the ZnS layer 18 to a thickness of about 200 nm by a sputter deposition method, and patterned by using photo-lithography and etching to form the pixel electrode 20. The pixel electrode 20 and the ZnS layer 18 can be etched at the same time by using a mixed etchant of phosphoric acid, nitric acid and acetic acid in patterning.

Figure 8D:
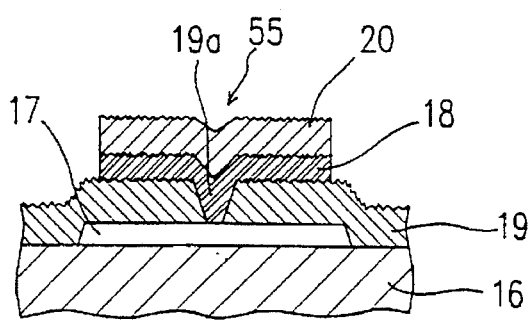

The pixel electrode 20 is patterned so as to be in the region where the bus line 17 is formed as shown in FIG. 8D. Thus the pixel electrode 20 serves both as the upper electrode of the active element 55 and as the reflector of the LCD apparatus. The pixel electrode 20 thus formed may have a corrugated surface according to the corrugated surface of the insulating layer 19.

By forming the bus line 17 wide enough corresponding to the pixel electrode 20 as shown in FIG. 6, the resistance of the bus line 17 can be reduced to low level. The width of the bus line 17 can be widened over that of the pixel electrode 20 to such an extent that the aperture ratio does not decrease.

It is desirable to form the through hole 19a at the portion corresponding to the center of the pixel electrode 20. By doing so, the applied voltage may have a substantially uniform effect over the entire area of the pixel electrode 20.

The production processes after that and the function of the LCD using the two-terminal device are the same as those described in the first example.

The LCD using the two-terminal device 55 manufactured as described above also has a very sharp I-V characteristic and a high aperture ratio.

The bus line 17 is formed wide enough and the pixel electrode 20 is formed within the region on the bus line 17, so that the pixel electrode 20 can be prevented from being formed on a step (i.e. an edge of the bus line 17). Therefore it can reduce the risk of a separation defect of the pixel electrode 20 on the step and a disturbance of the alignment of the liquid crystal molecules, and the like.

Further, because the pixel electrode 20 which also serves as a reflector has a corrugated surface, mirror reflection and metallic gloss can be prevented, and thus the display quality is enhanced.

The bus line 17 and the pixel electrode 20 may be made of electrically conductive materials other than the above mentioned materials. The ZnS layer 18 may also be formed by a film forming process other than sputtering; for example, an electron beam (EB) deposition process, a chemical vaper deposition (CVD) process or an atomic layer epitaxy (ALE) process.

The characteristics of the MSM element can also be finely controlled by changing the composition ratio of zinc (Zn) and sulfur (S) of the nonlinear resistive layer of ZnS, or by adding an impurity selected from rare earth elements such as terbium (Tb), samarium (Sm) and europium (Eu), group III elements such as aluminum (Al) and gallium (Ga) on other elements such as manganese (Mn) and copper (Cu), or compounds of these elements to the layer of ZnS. The characteristics of the active element can also be changed by interposing a relatively thin insulating layer on the upper face and/or lower face of the non-linear resistive layer.

Further, by controlling the area of the through hole 19a, the area of the two-terminal device can be controlled so as to control the characteristic of the two-element device.

EXAMPLE 3

Referring to FIGS. 9 to 11E, a third example of a display apparatus according to the present invention will be described.

Figure 10:
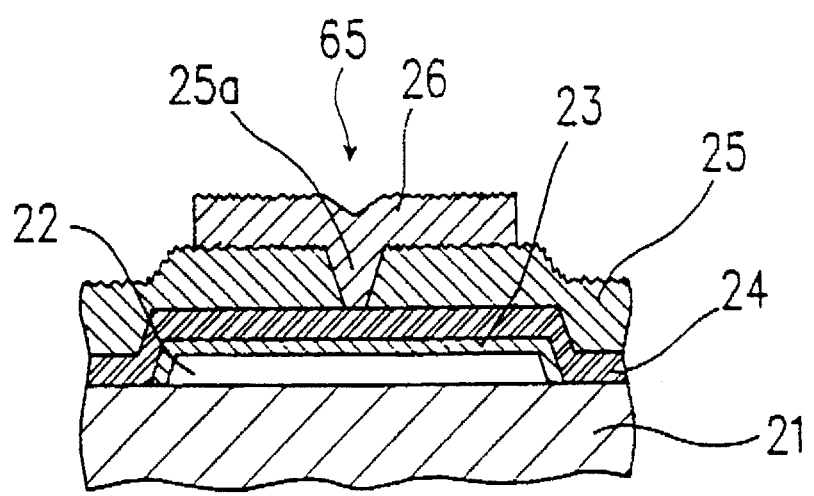
FIG. 10 is a cross-sectional view of the liquid crystal display apparatus shown in FIG. 9 looking along section line 130–130' in FIG. 9.

FIGS. 9 and 10 show a part of an LCD apparatus 60 in the third example according to the present invention. FIG. 9 is a top view of a rectangular pixel electrode 26 and the vicinity thereof in the LCD apparatus 60; and FIG. 10 is a cross-sectional view of the LCD apparatus 60 shown in FIG. 9 looking along section line 130–130' in FIG. 9.

As is shown in FIG. 10, the LCD apparatus 60 includes the base substrate 21. The bus line 22 is on the top surface of the base substrate 21. The bus line 22 has a width nearly equal to or wider than that of the pixel electrode 26. In this third example, a first insulating layer 23 without a through hole is interposed between a bus line 22 and a nonlinear resistive (ZnS) layer 24, and a second insulating layer 25 having a through hole 25a is formed on the ZnS layer 24.

The pixel electrode 26 is on the insulating layer 25 filling the through hole 25a. The two-terminal device 65 is formed in the area in which the through hole 25a is formed. The two-terminal device 65 includes the three-layer structure including the lower electrode (a corresponding portion of the bus line) 22, the ZnS layer 24, and the upper electrode (a corresponding portion of the pixel electrode) 26.

The LCD apparatus 60 having the above-described structure is produced in the following manner.

Figure 11A:
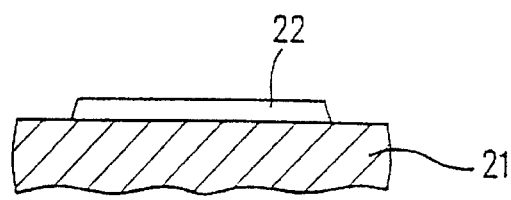
FIGS. 11A to 11E are diagrams illustrating the process of forming an element side substrate provided in the liquid crystal display apparatus of the third example.

First, a film of Ta is formed on the base substrate 21 in a specified thickness by sputtering and patterned into a specified pattern to form the bus line 22 (FIG. 11A). The base substrate 21 is formed of a glass (for example, borosilicate glass #7059 made by Corning Glass Inc.). The bus line 22 is formed by using a photo-lithography process and RIE. The bus line 22 is made wide similarly to the second example and the thickness of the bus line 22 is about 300 nm.

Figure 11B:
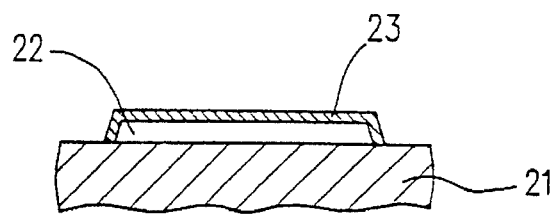

Then the bus line 22 made of Ta is anodized to form the first insulating layer 23 made of $Ta_2O_5$ as shown in FIG. 11B. Anodization is carried out for 1 hour with a conversion voltage of 34 V by using a water solution of ammonium tartrate (concentration: 0.1 wt %) as the electrolytic solution for anodization. The first insulating layer 23 made of $Ta_2O_5$ is formed to a thickness of about 70 nm. The first insulating layer 23 having a relatively thin thickness has effects such as improving the withstanding voltage of the active element 65.

Figure 11C:
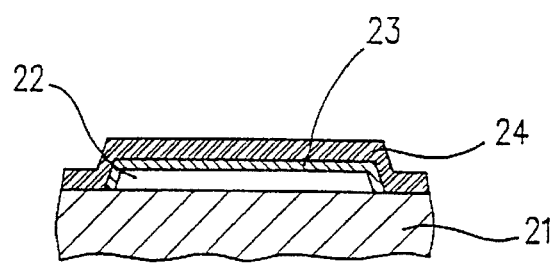

Then, the nonlinear resistive layer 24 is formed over the entire surface of the base substrate 21 to a thickness of about 150 nm as shown in FIG. 11C by electron beam (EB) deposition using a target made of ZnS. Use of the EB deposition method has an advantage of being capable of forming a film having substantially the same component ratio as that of the target.

Figure 11D:
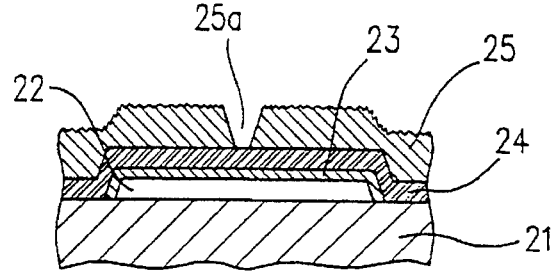

Then, the second insulating layer 25 made of silicon nitride (SiNx) is formed by sputtering as is illustrated in FIG. 11D.

The insulating layer 25 may be lightly hit by $CF_4+O_2$ gas plasma on the top face thereof, using a similar process as the RIE, so as to form a corrugated surface on the insulating layer 25. A surface of the pixel electrode 26 formed on the insulating layer 25 is also corrugated. By such a corrugation, the pixel electrode 26 functions as a good reflector.

Using photo-lithography and RIE processes, a through hole 25a is formed as shown in FIG. 11 in the second insulating layer 25 for connecting the ZnS layer 24 and the pixel electrode 26. The through hole 25a is positioned at the center of the bus line 22 in its width direction. The opening area of the through hole is preferably in a range 10 $\mu m^2$ to 1,000 $\mu m^2$.

A film of Al is formed on the ZnS layer 24 in a thickness of about 200 nm by sputter deposition method, and patterned by using photo-lithography and etching to form the pixel electrode 26.

Figure 11E:
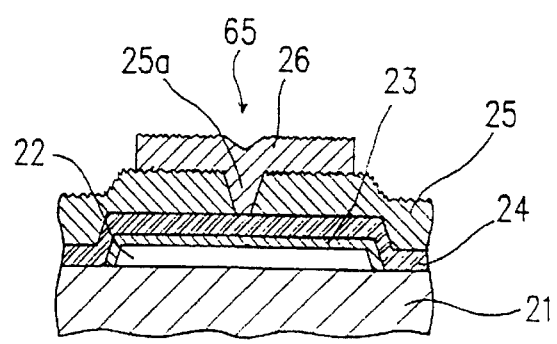

The pixel electrode 26 is patterned so as to be in the region where the bus line 22 is formed as shown in FIG. 11E. Thus the pixel electrode 26 serves both as the upper electrode of the active element 65 and as the reflector of the LCD apparatus. The pixel electrode 26 thus formed may have a corrugated surface according to the corrugated surface of the second insulating layer 25.

By forming the bus line 22 wide enough corresponding to the pixel electrode 26 as shown in FIG. 9, the resistance of the bus line 22 can be reduced to low level. The width of the bus line 22 can be widened over that of the pixel electrode 26 to such an extent that the aperture ratio does not decrease.

It is desirable to form the through hole 25a at the portion corresponding to the center of the pixel electrode 26. By doing so, the applied voltage may have a effect substantially uniform effect over the entire area of the pixel electrode 26.

Production processes after that and the function of the LCD using the two-terminal device are the same as those described in the first and the second example.

The LCD using the two-terminal device 65 manufactured as described above also has a very sharp I-V characteristic and a high aperture ratio.

The bus line 22 is formed wide enough and the pixel electrode 26 is formed within the region on the bus line 22, so that the pixel electrode 26 can be prevented from being formed on a step (i.e. an edge of the bus line 22). Therefore it can reduce the risk of a separation defect of the pixel electrode 26 on the step and a disturbance of the alignment of the liquid crystal molecules, and the like.

Further, because the pixel electrode 26 which also serves as a reflector has a corrugated surface, mirror reflection and metallic gloss can be prevented, and thus the display quality is enhanced.

The bus line 22, the second insulating layer 25 and the pixel electrode 26 may be made of materials other than the above mentioned materials. The ZnS layer 24 may also be formed by a film forming process other than sputtering; for example, an electron beam (EB) deposition process, a chemical vapor deposition (CVD) process or an atomic layer epitaxy (ALE) process.

The characteristics of the MSM element can also be finely controlled by changing the composition ratio of zinc (Zn) and sulfur (S) of the nonlinear resistive layer of ZnS, or by adding an impurity selected from rare earth elements such as terbium (Tb), samarium (Sm) and europium (Eu), group III elements such as aluminum (Al) and gallium (Ga) and other elements such as manganese (Mn) and copper (Cu), or compounds of these elements to the layer of ZnS. The characteristics of the active element can also be changed by interposing a relatively thin insulating layer on the upper face and/or lower face of the nonlinear resistive layer.

Further, by controlling the area of the through hole 25a, the area of the two-terminal device can be controlled so as to control the characteristic of the two-element device.

EXAMPLE 4

Referring to FIGS. 12 to 14E, a fourth example of a display apparatus according to the present invention will be described.

Figure 13:
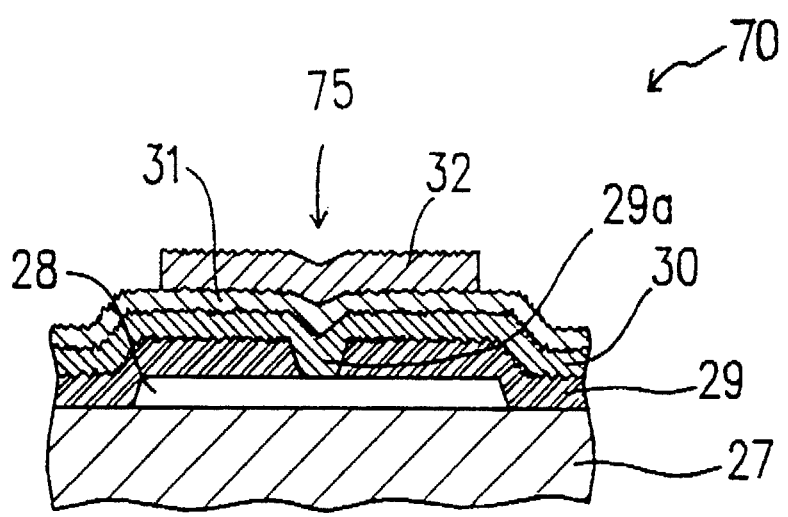
FIG. 13 is a cross-sectional view of the liquid crystal display apparatus shown in FIG. 12 looking along section line 140–140' in FIG. 12.

FIGS. 12 and 13 show a part of an LCD apparatus 70 in the forth example according to the present invention. FIG. 12 is a top view of a rectangular pixel electrode 32 and the vicinity thereof in the LCD apparatus 70; and FIG. 13 is a cross-sectional view of the LCD apparatus 70 shown in FIG. 12 looking along section line 140–140' in FIG. 12.

As is shown in FIG. 13, the LCD apparatus 70 includes the base substrate 27. The bus line 28 is on the top surface of the base substrate 27. The bus line 28 has a width nearly equal to or wider than that of the pixel electrode 32. In this fourth example, a first insulating layer 29 having a through hole 29a is interposed between a bus line 28 and a nonlinear resistive (ZnS) layer 30, and a second insulating layer 31 without a through hole is formed on the ZnS layer 30.

The ZnS layer 30 is on the insulating layer 29 filling the through hole 29a. The two-terminal device 75 is formed in the area in which the through hole 29a is formed. The two-terminal device 75 includes the three-layer structure including the lower electrode (a corresponding portion of the bus line) 28, the ZnS layer 30, and the upper electrode (a corresponding portion of the pixel electrode) 32.

A LCD apparatus 70 having the above-described structure is produced in the following manner.

Figure 14A:
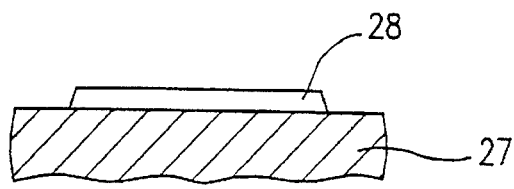
FIGS. 14A to 14E are diagrams illustrating the process of forming an element side substrate provided in the liquid crystal display apparatus of the fourth example.

First, a film of Ta is formed on the base substrate 27 in a specified thickness by sputtering and patterned into a specified pattern to form the bus line 28 (FIG. 14A). The base substrate 27 is made of a glass (for example, borosilicate glass #7059 made by Corning Glass Inc.). The bus line 28 is formed by using a photo-lithography process and RIE. The bus line 28 is made wide similarly to the second example and the thickness of the bus line 28 is about 300 nm.

Then, the first insulating layer 29 made of SiOx about 200 nm thick is formed by sputtering. The insulating layer 29 may be lightly hit by $CF_4+O_2$ gas plasma on the top face thereof, using a similar process as the RIE, so as to form a corrugated surface on the insulating layer 29. A surface of the pixel electrode 32 (via the ZnS layer 30) formed on the insulating layer 29 is also corrugated. By such a corrugation, the pixel electrode 32 functions as a good reflector.

Figure 14B:
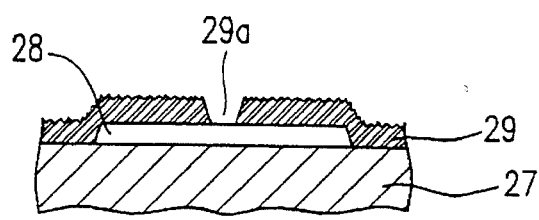

Using photo-lithography and RIE processes, a through hole 29a is formed as shown in FIG. 14B in the first insulating layer 29 for connecting the bus line 28 and the ZnS layer 29. The through hole 29a is positioned at the center of the bus line 28 in its width direction. The opening area of the through hole is preferably in a range 10 $\mu m^2$ to 1,000 $\mu m^2$.

Figure 14C:
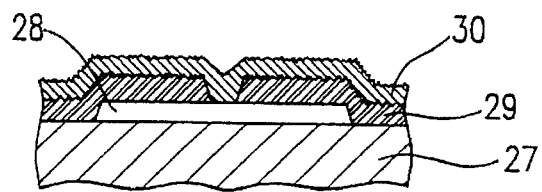

Then, the nonlinear resistive layer 30 is formed over the entire surface of the base substrate 27 to a thickness of about 150 nm as shown in FIG. 14C by electron beam (EB) deposition using a target made of ZnS. Use of the EB deposition method has an advantage of being capable of forming a film having substantially the same component ratio as that of the target.

Figure 14D:
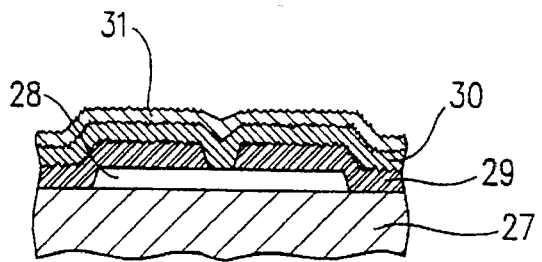

Then the second insulating layer 31 made of SiNx is formed to a thickness of about 70 nm as shown in FIG. 14D by sputtering. The second insulating layer 31 having a relatively thin thickness contributes to improve the withstanding voltage of the active element 75.

A film of Al is formed on the second insulating layer 31 to a thickness of about 200 nm by using a sputter deposition method, and patterned by using photo-lithography and etching to form the pixel electrode 32.

Figure 14E:
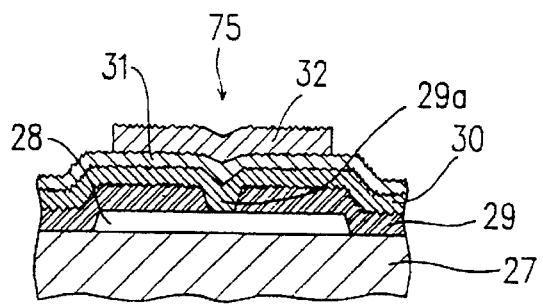
Figure 15:
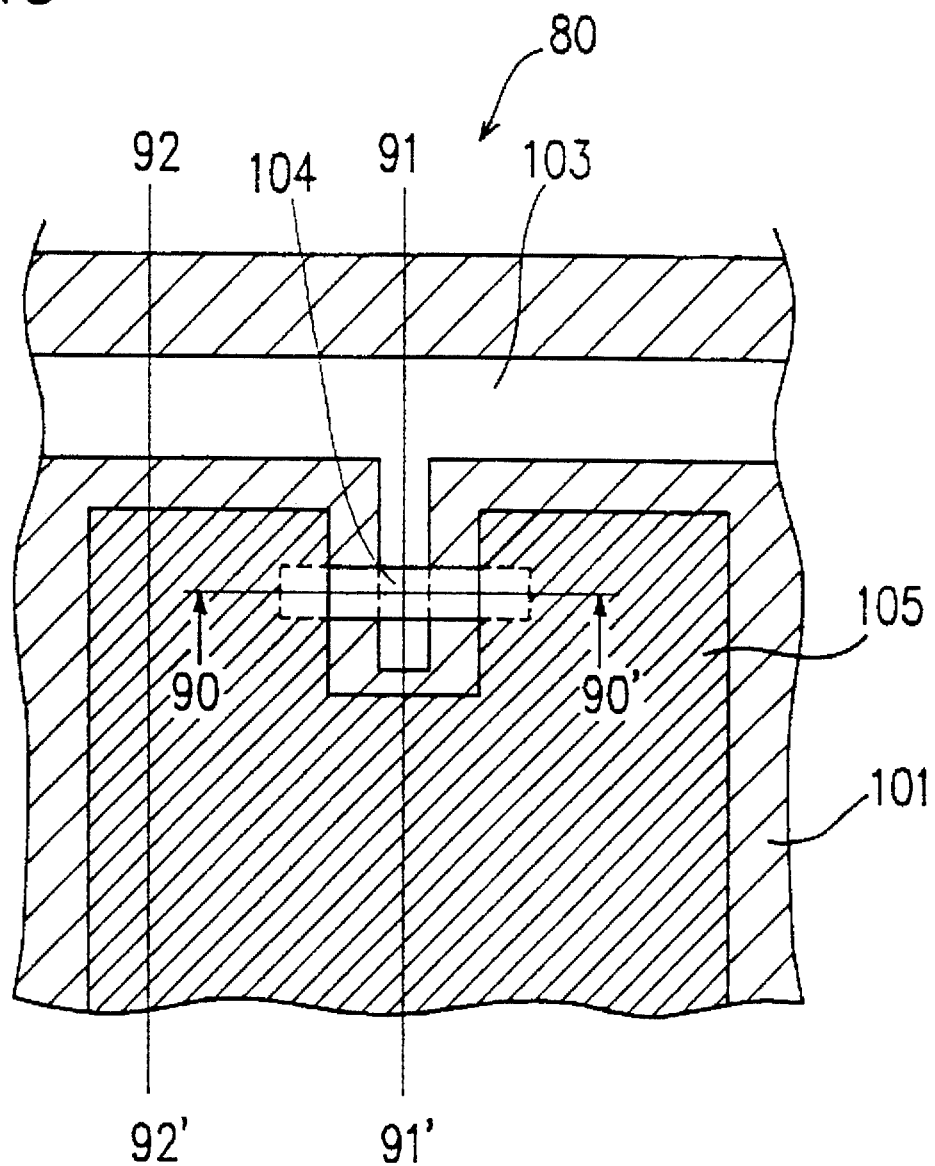
FIG. 15 is a top view of a part of a conventional liquid crystal display apparatus.
Figure 16A:
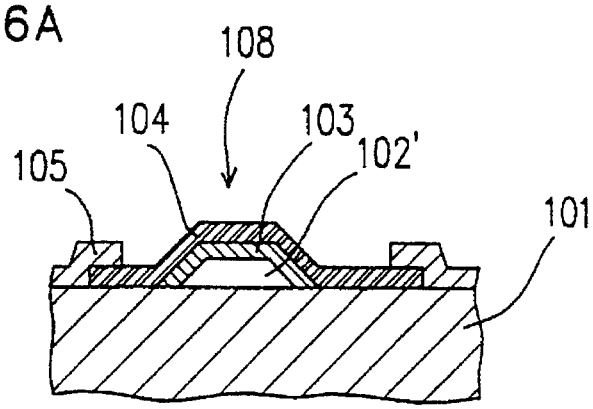
FIGS. 16A to 16C are diagrams illustrating the process of forming an element side substrate provided in the liquid crystal display apparatus of a conventional liquid crystal display apparatus.
Figure 16B:
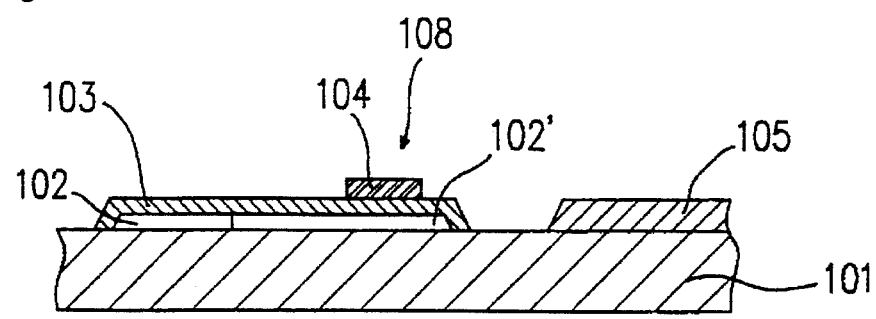
Figure 16C:
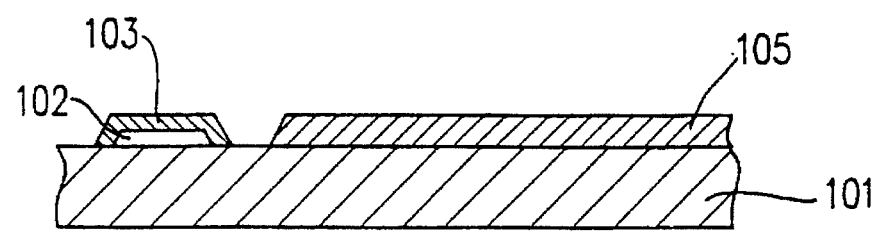

The pixel electrode 32 is patterned so as to be in the region where the bus line 28 is formed as shown in FIG. 14E. Thus the pixel electrode 32 serves both as the upper electrode of the active element 75 and as the reflector of the LCD. The pixel electrode 32 thus formed may have a corrugated surface according to the corrugated surface of the first insulating layer 29.

By forming the bus line 28 wide enough corresponding to the pixel electrode 32 as shown in FIG. 12, the resistance of the bus line 28 can be reduced to low level. The width of the bus line 28 can be widened over that of the pixel electrode 32 to such an extent that the aperture ratio does not decrease.

It is desirable to form the through hole 29a at the portion corresponding to the center of the pixel electrode 32. By doing so, the applied voltage may have a substantially uniform effect over the entire area of the pixel electrode 32.

Production processes after that and the function of the LCD using the two-terminal device are as same as those described in the first and the second example.

The LCD using the two-terminal device 75 manufactured as described above also has a very sharp I-V characteristic and a high aperture ratio.

The bus line 28 is formed wide enough and the pixel electrode 32 is formed within the region on the bus line 28, so that the pixel electrode 32 can be prevented from being formed on a step (i.e. an edge of the bus line 28). Therefore it can reduce the risk of a separation defect of the pixel electrode 32 on the step and a disturbance of the alignment of the liquid crystal molecules, and the like.

Further, because the pixel electrode 32 which also serves as a reflector has a corrugated surface, mirror reflection and metallic gloss can be prevented, and thus the display quality is enhanced.

In the fourth embodiment, the pixel electrode 32, the first insulating layer 29, the second insulating layer 31 and the bus line 28 may be made of other materials than the above mentioned materials. The nonlinear resistive layer 30 made of ZnS may also be formed by a film forming process other than the electron beam (EB) deposition; for example, a sputtering, a chemical vapor deposition (CVD) and an atomic layer epitaxy (ALE) process.

The characteristics of the MSM element can also be finely controlled by changing the composition ratio of zinc (Zn) and sulfur (S) of the nonlinear resistive layer of ZnS, or by adding an impurity selected from rare earth elements such as terbium (Tb), samarium (Sm) and europium (Eu), group III elements such as aluminum (Al) and gallium (Ga) and other elements such as manganese (Mn) and copper (Cu), or compounds of these elements to the layer of ZnS. The characteristics of the active element can also be changed by interposing a relatively thin insulating layer on upper face and/or lower face of the nonlinear resistive layer.

Through holes may be formed in both the first and second insulating layers 29 and 31, in which case making one of the through holes with a larger area than the other provides an advantage that accuracy is not required in positioning the through hole.

The invention is not limited to the above Examples 1 through 4, and may be applied to such constitutions in general as the nonlinear resistive layer of the active element is made of ZnS and the bus line passes below the pixel electrode.

According to the invention, characteristics of the active element can be improved by adding an impurity selected from rare earth elements such as terbium (Tb), samarium (Sm) and europium (Eu), group III elements such as aluminum (Al) and gallium (Ga) and other elements manganese (Mn) and copper (Cu), or compounds of these elements in the ZnS target.

Characteristics of the active element can also be changed by adjusting the component ratio of the target (Zn:S ratio). The component ratio between the zinc and sulfur in the zinc sulfide layer is not limited to the stoichiometric ratio. Varying the component ratio between Zn and S enables control of the electrical characteristics of the two-terminal element.

According to the invention, the thickness of the nonlinear resistive (ZnS) layer is preferably within a range from 50 nm up to 500 nm. The reason is as follows. When the thickness is less than 50 nm, device defects caused by such as a current leakage may occur, and when the thickness is more than 500 nm, the sharp I-V characteristics of the ZnS layer diminishes and the ZnS layer changes into an insulating state.

According to the invention, such a photosensitive resin as used in the first example may be used in part or all of the insulating layers, which results in the simplification of the manufacturing process.

Silicon nitride or silicon oxide may be used in part or all of insulating layers described in the examples as well as the insulating layers 18, 25 and 29. Highpolymer compounds such as polyimide and acrylic may be also used instead of silicon nitride and silicon oxide. Use of such a highpolymer compound has an advantage of simplifying the film formation process by means of spinner coating.

As described above in detail, according to the invention, the two-terminal device of the LCD has an MSM structure including ZnS layer as its nonlinear resistive layer. The two-terminal device has a sharp I-V characteristic and is capable of driving a PCGH mode liquid crystal.

According to the invention, the bus line passes under the pixel electrode instead of being disposed beside the pixel electrode, and so the aperture ratio can be improved. As a result, the efficiency of utilizing the light can be increased. Further, the characteristics of the two-terminal element can be controlled by changing various parameters such as the component ratio between Zn and S in the ZnS layer, impurity and its concentration of the dopant, and the thickness and materials of the insulating layers.

By making the bus line as wide as possible, resistance of the bus line can be decreased. This may be possible in the special configuration of the present invention that the bus line is disposed under the pixel electrode. In cases where the pixel electrode is formed in such a manner as it is completely within a region where the bus line is formed, the pixel electrode can be prevented from being formed in a step (an edge of the bus line). Therefore it can reduce the risk of a separation defect of the pixel electrode on the step and the disturbance of the alignment of the liquid crystal molecules.

In cases where the through hole is formed in the portion corresponding to the center of the pixel electrode, the applied voltage may have a substantially uniform effect over the entire area of the pixel electrode.

Moreover, because pattern forming of the nonlinear resistive layer is basically not required, the manufacturing process can be simplified.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A display apparatus for performing a display by modulating the optical characteristics of a display medium, the apparatus comprising:

a first substrate;

a second substrate facing the first substrate;

a display medium interposed between the first and the second substrates;

a plurality of bus lines disposed on the first substrate, the bus lines being arranged substantially in parallel to each other in a first direction;

a plurality of counter electrodes disposed on the second substrate, the counter electrodes being arranged substantially in parallel to each other in a second direction which is perpendicular to the first direction;

arrays of a plurality of reflection electrodes disposed above the first substrate to substantially completely cover a respective one of the bus lines; and a nonlinear resistive layer and an insulating layer which are disposed between the bus lines and the reflection electrodes, the nonlinear resistive layer mainly made of zinc sulfide, and the insulating layer having a plurality of through holes each of which connects the nonlinear resistive layer to a corresponding reflection electrode, wherein the nonlinear resistive layer is electrically connected to the bus line and the reflection electrode through the through hole, and the nonlinear resistive layer is in a non-conductive state when a voltage of a value smaller than a predetermined value is applied, and is in a conductive state when a voltage of a value equal to or larger than the predetermined value is applied.

2. A display apparatus according to claim 1, wherein the insulating layer is formed on the nonlinear resistive layer to cover the nonlinear resistive layer.

3. A display apparatus according to claim 2, wherein a second insulating layer is formed between the bus line and the nonlinear resistive layer.

4. A display apparatus according to claim 3, wherein the second insulating layer is obtained by anodizing the bus line.

5. A display apparatus according to claim 3, wherein the second insulating layer is formed of a substance selected from the group consisting of a nitrogen compound and silicon oxide.

6. A display apparatus according to claim 2, wherein the insulating layer is formed of a substance selected from the group consisting of a polymer compound and a photosensitive resin.

7. A display apparatus according to claim 6, wherein the polymer compound is selected from the group consisting of silicon nitride, silicon oxide, polyimide, and acrylic.

8. A display apparatus according to claim 1, wherein the insulating layer is formed on the first substrate to cover the bus line.

9. A display apparatus according to claim 8, wherein a second insulating layer is formed between the nonlinear resistive layer and the reflection electrode.

10. A display apparatus according to claim 9, wherein the second insulating layer is formed of a substance selected from the group consisting of a nitrogen compound and silicon oxide.

11. A display apparatus according to claim 8, wherein the insulating layer is formed of a substance selected from the group consisting of a polymer compound and a photosensitive resin.

12. A display apparatus according to claim 11, wherein the polymer compound is selected from the group consisting of silicon nitride, silicon oxide, polyimide, and acrylic.

13. A display apparatus according to claim 1, wherein a surface of the insulating layer is made uneven which causes a surface of the reflection electrode to be uneven.

14. A display apparatus according to claim 1, wherein the reflection electrode is formed of a material selected from the group consisting of Al, Ag, Cr, Ni, Cu, Ti, and alloys thereof.

15. A display apparatus according to claim 1, wherein the counter electrodes are substantially transparent.

16. A display apparatus according to claim 1, wherein the through hole has an opening having an area of 10 $\mu m^2$ to 1000 $\mu m^2$ inclusive.

17. A display apparatus according to claim 1, wherein the through hole is located substantially under the center of the reflection electrode.

18. A display apparatus according to claim 1, wherein the nonlinear resistive layer has a thickness in the range of 50 nm to 500 nm.

19. A display apparatus according to claim 1, wherein the nonlinear resistive layer includes an impurity.

20. A display apparatus according to claim 19, wherein the impurity is selected from the group consisting of manganese, copper, rare earth elements, compounds including a rare earth element, the group III elements, and compounds thereof.

21. A display apparatus according to claim 1, wherein the nonlinear resistive layer is made of zinc sulfide having a composition expressed by $Zn_xS_{(1-x)}$, where x satisfies the condition of x≠0.5.

22. A display apparatus according to claim 1, wherein the width of the bus line in the second direction is smaller than the width of the reflection electrode in the second direction.

23. A display apparatus according to claim 1, wherein the width of the bus line in the second direction is larger than the width of the reflection electrode in the second direction.

24. A display apparatus according to claim 1, wherein the width of the bus line in the second direction is substantially equal to the width of the reflection electrode in the second direction.

25. A display apparatus according to claim 1, wherein the display medium is a liquid crystal.

26. A display apparatus according to claim 25, wherein the display medium is a cholesteric-nematic phase change guest-host mode liquid crystal.

27. A two terminal MSM display element formed on a first substrate, the first substrate being opposed to a second substrate and a liquid crystal display medium being disposed therebetween, the second substrate having a counter electrode formed thereon, the display element comprising:

a bus line formed on the first substrate;

a non-linear resistive layer formed over the bus line;

a pixel electrode formed over the non-linear resistive layer;

a first insulating layer, the first insulating layer having a through hole through which the non-linear resistive layer electrically connects the bus line and the pixel electrode;

wherein the non-linear resistive layer is primarily zinc sulfide.

28. The two terminal MSM display element of claim 27, wherein the first insulating layer is formed on the non-linear resistive layer to cover the non-linear resistive layer.

29. The two terminal MSM display element of claim 27, wherein the first insulating layer is formed on the first substrate to cover the bus line.

30. A display apparatus for performing a display by modulating the optical characteristics of a display medium, the apparatus comprising:

a first substrate;

a second substrate facing the first substrate;

a display medium interposed between the first and the second substrates;

a plurality of bus lines disposed on the first substrate, the bus lines being arranged substantially in parallel to each other in a first direction;

a plurality of counter electrodes disposed on the second substrate, the counter electrodes being arranged substantially in parallel to each other in a second direction which is perpendicular to the first direction;

arrays of a plurality of reflection electrodes disposed above the first substrate to substantially completely cover a respective one of the bus lines; and a nonlinear resistive layer and an insulating layer which are disposed between the bus lines and the reflection electrodes, the nonlinear resistive layer mainly made of zinc sulfide, and the insulating layer having a plurality of through holes each of which connects the nonlinear resistive layer to a corresponding bus line, wherein the nonlinear resistive layer is electrically connected to the bus line through the through hole and to the reflection electrode, and the nonlinear resistive layer is in a non-conductive state when a voltage of a value smaller than a predetermined value is applied, and is in a conductive state when a voltage of a value equal to or larger than the predetermined value is applied.

* * * * *